United States Patent
Brinkmeier et al.

[11] Patent Number: 5,802,945
[45] Date of Patent: Sep. 8, 1998

[54] NEEDLE ROLLER ARRANGEMENT WITH SEVERAL NEEDLE ROLLERS FOR PERFORATING A MATERIAL WEB

[75] Inventors: Friedhelm Brinkmeier; Achim Seeberger, both of Lengerich, Germany

[73] Assignee: Windmöller & Hölscher, Lengerich, Germany

[21] Appl. No.: 754,478

[22] Filed: Nov. 22, 1996

[30] Foreign Application Priority Data

Nov. 28, 1995 [DE] Germany ............. 195-44 330.6

[51] Int. Cl.$^6$ .................................................. B26F 1/24
[52] U.S. Cl. ........................................ 83/660; 83/175
[58] Field of Search .................. 83/660, 866, 867, 83/868, 30, 18, 175

[56] References Cited

U.S. PATENT DOCUMENTS

| | | | |
|---|---|---|---|
| 3,079,826 | 3/1963 | Shively | 83/660 |
| 3,212,381 | 10/1965 | Heyer | 83/660 |
| 3,381,731 | 5/1968 | Bath et al. | 83/867 |
| 3,490,664 | 1/1970 | Boultinghouse | 83/660 |
| 3,747,447 | 7/1973 | Wisner | 83/660 |
| 4,055,101 | 10/1977 | Collins | 83/660 |
| 4,083,273 | 4/1978 | Hillman et al. | 83/660 |
| 5,019,028 | 5/1991 | Engel et al. | 83/660 |
| 5,386,752 | 2/1995 | Siegel | 83/660 |

*Primary Examiner*—Maurina T. Rachuba
*Attorney, Agent, or Firm*—Evenson, McKeown, Edwards & Lenahan, PLLC

[57] ABSTRACT

A needle roller arrangement includes several needle rollers arranged in a freely rotatable manner in a rotary frame on a circular line which is concentric to its rotational axis. One of the needle rollers interacts with a brush roller for perforating a material web passing through the arrangement. In order to be able to lift the needle roller interacting with the brush roller away and replace it while requiring less energy, each roller is arranged inside the rotary frame such that it can be lifted off of the brush roller. The needle roller interacting with the brush roller is respectively provided with an arrangement for removal from the brush roller and application to the brush roller.

8 Claims, 2 Drawing Sheets

NEEDLE ROLLER ARRANGEMENT WITH SEVERAL NEEDLE ROLLERS FOR PERFORATING A MATERIAL WEB

BACKGROUND OF THE INVENTION

1. Field of the Invention

This invention relates to a needle roller arrangement with several needle rollers which are mounted in a rotary frame in a freely rotatable arrangement on a circular line which is concentric with the rotational axis of the rotary frame. One of the rollers interacts in each case with a backup roller, preferably a brush roller, for the purpose of perforating a material web passing through the arrangement.

2. Description of Related Art

Needle rollers are used for perforation of paper or synthetic material webs during the manufacture of bags in order to create channels for the purpose of ventilating the bags. In order to be able to create a variety of perforation patterns and/or holes of varying diameter in the webs, several needle rollers, preferably four needle rollers, are arranged in a rotary frame in a revolver-like manner in order to be able to position the respectively desired needle roller quickly and in a simple manner on the brush roller and to be able to allow it to interact with the brush roller. The revolver-like mounting of the needle rollers in a rotary frame is useful not only for the purpose of applying various holes and/or perforation patterns, but also for the exchange of worn out needle rollers. If the needles of one needle roller have become dull, another needle roller may be rotated into the operating position and the removed needle roller may be exchanged.

For example, during the manufacture of bags, it is necessary to prevent the needle rollers from having a continuous effect on the material web passing through the manufacturing assembly. This is because the perforations are not desired in areas which later, during the assembly of the bag, will be coated with adhesive, such as transverse adhesive strips, since then the adhesive might be pressed through in areas which are provided with perforations. For this reason, in known needle roller arrangements, the rotary frame, together with all needle rollers, is lifted off, preferably in the rhythm of the machine, for the purpose of moving the engaged needle roller away from the brush roller, whereupon the assembly is again turned on. However, this arrangement is disadvantageous since, for the purpose of engaging and disengaging the rotary frame and the needle rollers, considerable masses must be accelerated, followed by braking which leads to an increase in wear and tear and a rough operation.

SUMMARY OF THE INVENTION

For this reason, it is an object of the invention to create a needle roller arrangement of the initially mentioned type in which the needle roller interacting with the brush roller can be lifted away from the brush roller and placed back on the brush roller while exhibiting a reduction in energy consumption.

In accordance with the invention, this object involving a needle roller arrangement of the initially indicated type is achieved by seating each needle roller in the rotary frame such that it can be lifted off and replaced on the brush roller so that the needle roller interacts with the brush roller. In other words, an arrangement is provided for lifting the needle roller away from and placing it back on the brush roller.

For this reason, with the needle roller arrangement of the invention, the individual needle rollers interacting with the brush roller can also be lifted away from the brush roller and placed on the brush roller while showing a decrease in energy consumption, because only the smaller mass of the needle roller, and not that of the rotary frame, is moved with all needle rollers.

Advantageously, the rotary frame includes two disks, mounted on a central shaft arranged in a frame, in which the needle rollers are mounted. In the place of a disk, it would also be possible to provide spoke-like carriers for mounting the needle rollers or other support arrangements.

The seats of the needle rollers may be displaceable inside the guides of the disks. Central lines of the guides intersect, in the operating position, with the axes of the respective needle roller and the central shaft.

In order to permit a rapid and simple lifting off of the respective needle roller which is in the operating position, the seats of the needle rollers may be displaceable inside the guides towards the central shaft against the force of a spring.

In another embodiment of the invention, provisions are made so that the needle rollers are freely rotatable on axes whose end areas can be slid in the longitudinal direction inside the guides of the disks or mountings.

The seats or the end areas of the axes of the needle rollers may be provided with surfaces or guide sockets for the engagement of levers, push rods or rollers, lifting the respective needle roller away from the brush roller.

For intermittently lifting off of the needle roller in the operating position, a lever system driven by a rotating cam plate and/or a push rod may be provided. Advantageously, the cam plate is driven in the rhythm of the machine so that, for example, perforations of the web can be omitted in those areas which are intended for later application of adhesive.

The central shaft may be provided with a drive for the purpose of changing the needle roller engaging the brush roller. This drive may consist of a hand-operated drive or of a servomotor.

BRIEF DESCRIPTION OF THE DRAWINGS

An example of the invention is explained in greater detail below with reference to the drawings, wherein.

DESCRIPTION OF THE PREFERRED EMBODIMENT

Figure 1:
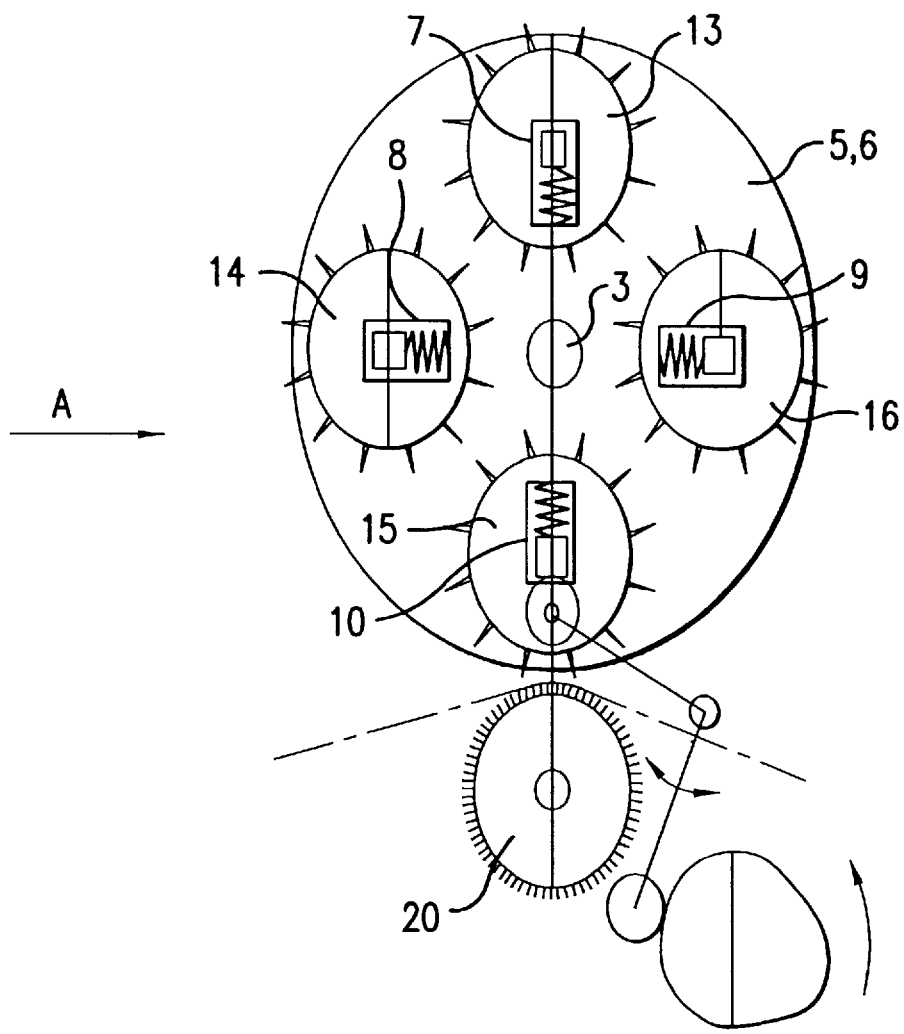
FIG. 1 is a side view of the needle roller arrangement in schematic representation.
Figure 2:
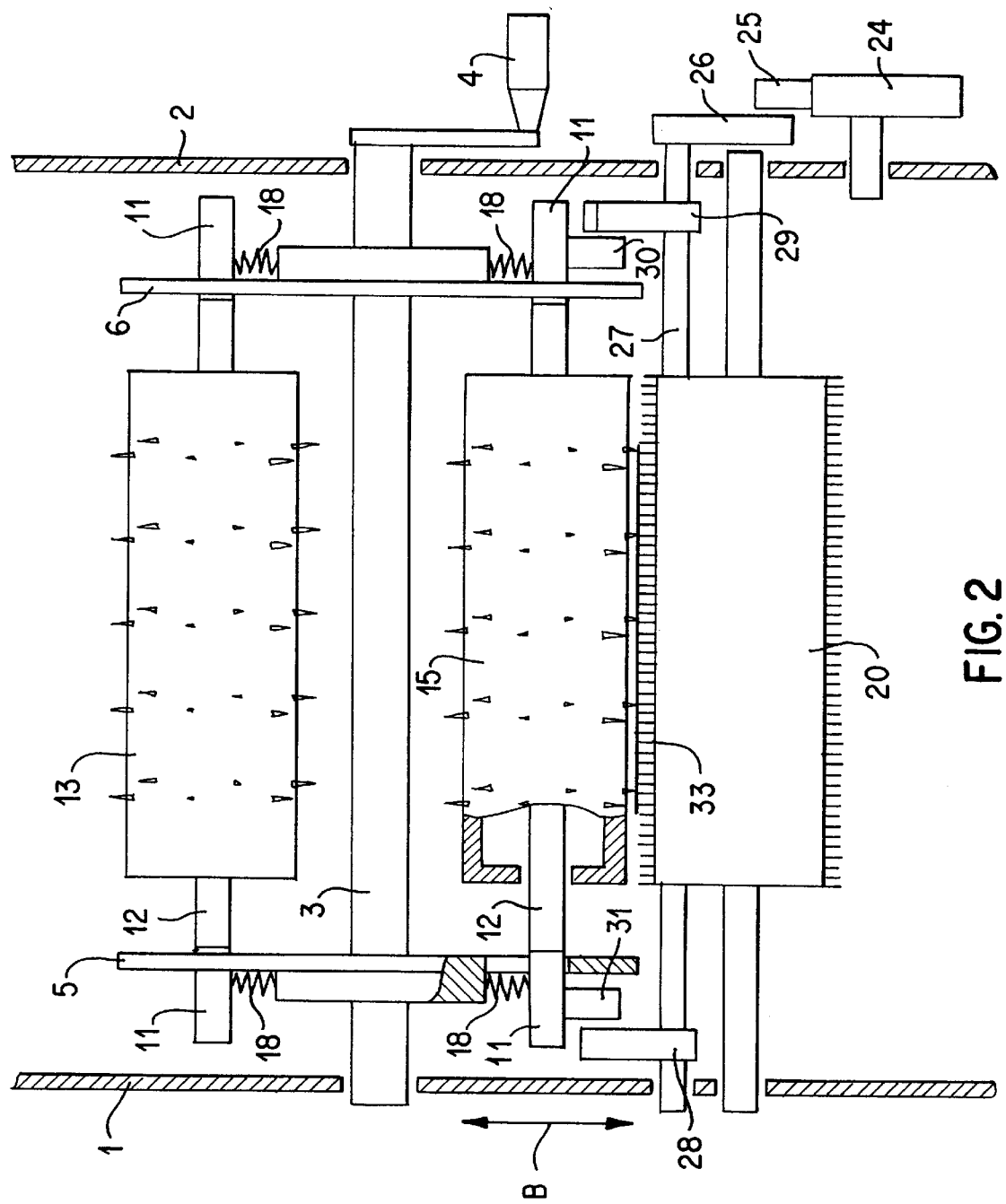
FIG. 2 is a view of the needle roller arrangement in the direction of the arrow A in FIG. 1.

The needle roller arrangement of the invention includes a central shaft (3) mounted in the side portions (1, 2) of a machine frame. The shaft, for the purpose of being turned, is provided with a drive shown, in the simplified example, in the form of a hand crank (4). On the shaft (3), two disks (5, 6) are attached. These disks are provided with guides, arranged along diametrical lines, represented in simplified form by rectangular sections (7 to 10). In these sections, the ends (11) of the shafts or axes (12) are quadrangular in cross-section. On the axes, needle rollers (13 to 16) can rotate freely, and are guided so that they cannot be turned but can be longitudinally displaced. The needle rollers (13 to 16) consist of cylinders whose covers are provided with radial needles of desired lengths and diameters and in any desired pattern.

The ends (11) of the shafts (12) are square pieces and are loaded by springs (18) in a direction toward their radial outer positions. Naturally, in the place of springs, a cup action of pneumatic springs or disk springs may be used or spring units combined with damping agents may be provided.

Below the revolver-like rotary frame (3, 5, 6), in the side sections (1, 2), a backup roller (20), formed by a brush roller in the example shown, is mounted in a freely rotatable manner.

The central shaft (3) is turned by its drive (4) into a position in which the lower needle roller (15) interacts with the brush roller (20). This position of the lower needle roller (15) is secured by a stop which is not shown.

In order to be able to lift a needle roller, which has been rotated into its operational position by the revolver-like rotary frame, off of the backup roller (20) in accordance with the rhythm of the machine, a cam plate (24) is rotatably mounted in the side portion (2). The cam plate is driven in a rotating manner in accordance with the rhythm of the machine or the provided processing stroke. On this cam plate (24), a roll (25) runs. The roll (25) is mounted in a freely rotatable manner on a lever (26) which is wedged onto a shaft (27) mounted in the side sections (1, 2) in a freely rotatable manner. On the shaft (27), parallel to each other, two levers (28, 29) are attached at whose free ends freely rotatable rollers (30, 31) are mounted. These rollers (30, 31) interact with the operating surfaces of the end pieces (11) of the axis of the respective needle roller in the operating position such that it is lifted against the effect of the springs (18) from the brush roller (20) such that the needles become disengaged from the material web (33) passing through.

The arrangement of the needle rollers, mounted in a rotary frame in a revolver-like manner for the perforation of material webs to be gathered during the manufacture of bags into a multilayered hose or tube, is known, for example, from DE-OS 195 15 167.4. Reference is made to this publication for a further explanation of application of the needle roller arrangement of the invention.

We claim:

1. A needle roller arrangement comprising:
   a plurality of needle rollers;
   a rotary frame, said needle rollers being mounted in a freely rotatable manner in said rotary frame on a circular line which is concentric to a rotational axis of said rotary frame;
   a brush roller with which only one of said needle rollers interacts at any particular time, said one of said needle rollers interacting with said brush roller for perforating a material web passing through, each needle roller being liftable off the brush roller while mounted inside the rotary frame; and
   a device for lifting the one of the needle rollers interacting with the brush roller away from the brush roller and placing it on the brush roller.

2. A needle roller arrangement in accordance with claim 1, wherein the rotary frame includes two disks in which the needle rollers are seated, and further comprising a machine frame and a shafts on which said disks are mounted, arranged centrally inside the machine frame.

3. A needle roller arrangement in accordance with claim 2, and further comprising guides defined in the disks which guide axle shafts of the needle rollers radially relative to the disks.

4. A needle roller arrangement in accordance with claim 3, wherein the axle shafts of the needle rollers can be moved in the guides in a direction towards the central shaft against a spring force.

5. A needle roller arrangement in accordance with claim 3, wherein the needle rollers are seated in a freely rotatable manner on the axle shafts and the axle shafts have end areas guided in the guides defined in the disks so they can be displaced longitudinally.

6. A needle roller arrangement in accordance with claim 4, wherein the axle shafts of the needle rollers are provided with surfaces for engaging rollers lifting a respective needle roller away from the brush roller.

7. A needle roller arrangement in accordance with claim 1, and further comprising a rotating cam plate for intermittently lifting off the needle roller interacting with the brush roller.

8. A needle roller arrangement in accordance with claim 2, wherein the central shaft is provided with a drive for changing the needle roller which interacts with the brush roller.

* * * * *